US010325001B2

(12) United States Patent
Buehler et al.

(10) Patent No.: US 10,325,001 B2
(45) Date of Patent: *Jun. 18, 2019

(54) OPERATING A PORTAL ENVIRONMENT

(71) Applicant: International Business Machines Corporation, Armonk, NY (US)

(72) Inventors: Dieter Buehler, Tuebingen (DE); Matthias Falkenberg, Stuttgart (DE); Peter Fischer, Marktrodach (DE); Richard Jacob, Filderstadt (DE); Stephen Laertz, Herrenberg (DE); Simon D. Naegele, Schonaich (DE); Juergen Schaeck, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 682 days.

This patent is subject to a terminal disclaimer.

(21) Appl. No.: 14/190,403

(22) Filed: Feb. 26, 2014

(65) Prior Publication Data
US 2015/0242503 A1    Aug. 27, 2015

(51) Int. Cl.
G06F 16/80     (2019.01)
G06F 17/22     (2006.01)
G06F 17/24     (2006.01)
H04L 29/08     (2006.01)
(Continued)

(52) U.S. Cl.
CPC ............ *G06F 16/986* (2019.01); *G06F 16/80* (2019.01); *G06F 16/958* (2019.01); *G06F 16/9577* (2019.01); *G06F 17/227* (2013.01); *G06F 17/2229* (2013.01); *G06F 17/2247* (2013.01);
(Continued)

(58) Field of Classification Search
None
See application file for complete search history.

(56) References Cited

U.S. PATENT DOCUMENTS 7,349,949 B1 *  3/2008  Connor ............... G06F 17/3089
                                                        709/200
7,676,557 B1 *  3/2010  Behl .................. G06F 9/451
                                                        709/220

(Continued)

OTHER PUBLICATIONS

List of IBM Patents Applications Treated as Related; U.S. Appl. No. 14/542,736, filed Nov. 17, 2014, 2 pgs.

*Primary Examiner* — David T. Brooks
(74) *Attorney, Agent, or Firm* — Contor Colburn LLP; Reza Sarbakhsh

(57) ABSTRACT

Systems and methods of operating a web portal environment are disclosed. One such computer-implemented method includes: triggering rendering of a content item being specified by a feed-driven list definition defining a new web content type; reading entries of the content item by a first tag that creates a request attribute containing query relevant information; listening to the request attribute; creating a query; passing the query to a feed integration service; executing the corresponding remote API call; receiving a response from an external data provider; passing the response to the feed-driven objects extension plug-in; creating a rendering context which can be accessed by a second tag; and inserting the external data into markup by the second tag based on a set of predefined feed-driven list presentation components.

3 Claims, 5 Drawing Sheets

(51) Int. Cl.
  *G06F 16/957* (2019.01)
  *G06F 16/958* (2019.01)
(52) U.S. Cl.
  CPC ............ *G06F 17/248* (2013.01); *H04L 67/02* (2013.01); *H04L 67/2838* (2013.01)

(56) References Cited

U.S. PATENT DOCUMENTS

| | | | |
|---|---|---|---|
| 7,739,310 B1* | 6/2010 | Shmulevich | G06F 17/3089 707/802 |
| 8,548,909 B1* | 10/2013 | Snow | G06F 17/30896 705/42 |
| 2002/0194267 A1 | 12/2002 | Flesner et al. | |
| 2003/0126558 A1 | 7/2003 | Griffin et al. | |
| 2004/0010598 A1* | 1/2004 | Bales | G06F 8/30 709/228 |
| 2004/0068554 A1* | 4/2004 | Bales | G06F 3/0481 709/218 |
| 2004/0183831 A1* | 9/2004 | Ritchy | G06F 8/38 715/762 |
| 2005/0021765 A1* | 1/2005 | Flores | G06Q 30/02 709/228 |
| 2005/0050454 A1* | 3/2005 | Jennery | G06F 17/30905 715/235 |
| 2005/0055634 A1* | 3/2005 | Burns | G06F 17/248 715/251 |
| 2005/0097190 A1* | 5/2005 | Abdelhak | G06F 17/30873 709/217 |
| 2005/0177815 A1* | 8/2005 | Kurz | G06F 9/451 717/104 |
| 2005/0283524 A1* | 12/2005 | Kim | G06F 17/30873 709/217 |
| 2005/0289468 A1* | 12/2005 | Kahn | G06F 17/3089 715/738 |
| 2006/0168102 A1 | 7/2006 | Faller et al. | |
| 2006/0230062 A1* | 10/2006 | Roy-Chowdhury | G06Q 30/0613 |
| 2006/0253411 A1 | 11/2006 | Roy-Chowdhury et al. | |
| 2006/0253459 A1* | 11/2006 | Kahn | G06F 17/30893 |
| 2007/0067712 A1 | 3/2007 | Baker et al. | |
| 2007/0157082 A1* | 7/2007 | Green | G06F 17/30873 715/234 |
| 2007/0209011 A1* | 9/2007 | Padmanabhuni | G06F 17/3089 715/762 |
| 2008/0120343 A1 | 5/2008 | Altrichter et al. | |
| 2008/0127133 A1 | 5/2008 | Aghara et al. | |
| 2008/0235601 A1* | 9/2008 | Fried | G06F 17/30873 715/760 |
| 2008/0256443 A1* | 10/2008 | Li | G06F 3/0486 715/700 |
| 2009/0013244 A1* | 1/2009 | Cudich | G06F 17/24 715/234 |
| 2009/0064004 A1* | 3/2009 | Chakra | G06F 17/3089 715/764 |
| 2010/0070847 A1* | 3/2010 | Hampton | G06F 17/3089 715/234 |
| 2010/0121879 A1* | 5/2010 | Greenberg | G06F 17/30398 707/779 |
| 2010/0192054 A1 | 7/2010 | Nauerz et al. | |
| 2011/0055193 A1 | 3/2011 | Lauridsen et al. | |
| 2011/0106835 A1* | 5/2011 | Lauridsen | G06F 17/3089 707/769 |
| 2012/0005187 A1 | 1/2012 | Chavanne | |
| 2012/0136922 A1* | 5/2012 | Falkenberg | G06F 17/3089 709/203 |
| 2012/0179738 A1 | 7/2012 | Nagai et al. | |
| 2012/0218124 A1 | 8/2012 | Lee et al. | |
| 2013/0262476 A1 | 10/2013 | Nimrod et al. | |
| 2014/0040711 A1* | 2/2014 | Brownlow | G06F 17/212 715/202 |
| 2014/0351263 A1* | 11/2014 | McConnell | G06F 17/30699 707/748 |
| 2015/0242528 A1 | 8/2015 | Buehler et al. | |

* cited by examiner

OPERATING A PORTAL ENVIRONMENT

BACKGROUND

The present invention relates in general to the field of web portals, and in particular to operating a portal environment.

Web portals allow a single entry point to provide a role-specific personalized view of applications and web contents of an enterprise by end users. Applications and information coming from multiple sources are aggregated into a portal page that serves a specific business need to help site visitors, customers, or employees get to their individual goals more efficiently. This could mean, for example, helping an employee to get the individual job tasks done more quickly and do faster and better decisions because all relevant information and applications are immediately at hand on the corresponding portal page, or helping a site visitor to find target information and application for her or his specific user profile. In those portal systems, the portal page is typically assembled by page editors putting the right set of application components (typically portlets) and the right set of accompanying web content onto those pages and then exposing those pages to individual user roles as needed. The web content, in turn, is typically created by content authors using a web content management system that provides the means to efficiently create web content supporting concepts like workflow based approval processes for new content, previewing of new draft content, versioning, reusable design components to support consistent look and feel, targeting of the right content to the right user profiles, archiving and syndicating newly created or modified content from an authoring system to individual delivery systems.

On the other hand, the industry sees an emerging trend for social web sites that typically provide a fixed set of services like Wikis, Blogs, Communities, Shared Bookmarks, or File Sharing, that can be used by users to collaborate on their individual topics of interest. On those platforms, the end users typically create their own wilds or communities according to their individual needs and other people can just join in and participate in the collaboration, which typically is based on the following set of interactions: create new information, e.g. posting to a blog, updating a wild page etc., sharing information, e.g. uploading a file or posting a relevant bookmark etc., and giving feedback, e.g. via adding recommendations or adding comments to information that other users have posted etc..

Integrating portals with external web sites like social sites is attractive since this allows offering strong collaboration services in combination with the right set of custom applications and managed web content to provide web sites that make the users even more productive as compared to using separate traditional portal pages and social sites.

SUMMARY

In one embodiment disclosed herein, a method comprises: triggering, by the computer, rendering of a content item that is specified through a feed-driven list definition that defines a new web content type; reading, by the computer, entries of the content item by a first tag, wherein the first tag creates a request attribute that contains query relevant information; listening to the request attribute by a feed-driven objects rendering extension plug-in that is executing on the computer; creating a query by the feed-driven objects rendering extension plug-in that is executing on the computer, the query based on the new web content type; passing, by the computer, the query to a feed integration service; executing, by the feed integration service that is executing on the computer, a remote application programming interface (API) call that corresponds to the query; receiving, by the feed integration service that is executing on the computer, a response from an external data provider; passing, by the computer, the response to the feed-driven objects extension plug-in; creating, by the computer, a rendering context which can be accessed by a second tag , the second tag providing access to individual metadata of remote data objects that is retrieved by the feed-driven objects rendering extension plug-in from at least one external data provider; and inserting, by the computer, the external data into markup by the second tag based on a set of predefined feed-driven list presentation components.

In another embodiment disclosed herein, a computer program product is provided for operating a portal environment. The computer program product comprises a computer readable storage medium having program instructions embodied therewith. The program instructions are executable by a processor to cause the processor to: trigger rendering of a content item that is specified through a feed-driven list definition that defines a new web content type; read entries of the content item by a first tag, wherein the first tag creates a request attribute that contains query relevant information; listen to the request attribute by a feed-driven objects rendering extension plug-in that is executing on the computer; create a query by the feed-driven objects rendering extension plug-in that is executing on the computer, the query based on the new web content type; pass the query to a feed integration service; execute, by the feed integration service, a remote application programming interface (API) call that corresponds to the query; receive by the feed integration service, a response from an external data provider; pass the response to the feed-driven objects extension plug-in; create a rendering context which can be accessed by a second tag , the second tag providing access to individual metadata of remote data objects that is retrieved by the feed-driven objects rendering extension plug-in from at least one external data provider; and insert the external data into markup by the second tag based on a set of predefined feed-driven list presentation components.

Yet another embodiment disclosed herein is a portal for use in a portal environment. The portal environment comprises a portal used by a client and connected to at least one external data provider that provides external feed data. The portal comprises a page model component, a portlet model component, and a web content manager to run at least one portal application, and a feed integration service facilitating data exchange between the at least one external data provider and the portal. The web content manager comprises: a web content rendering engine configured to transform a given content item into markup that can be rendered by the client; a feed-driven list definition defining a new web content type representing a query to define what kind of information to retrieve from the at least one external data provider and how to handle the retrieved information to specify a corresponding content item; a set of predefined feed-driven list presentation components used to build a visual intended representation of the external data provider content item retrieved by the new web content type. The web content rendering engine comprises a feed-driven objects rendering extension plug-in generating a query to the feed integration service and providing a corresponding response to the web content rendering engine based on the new web content type.

BRIEF DESCRIPTION OF THE SEVERAL VIEWS OF THE DRAWINGS

Embodiments of the present invention, as described in detail below, are shown in the drawings, in which.

DETAILED DESCRIPTION

Figure 1:
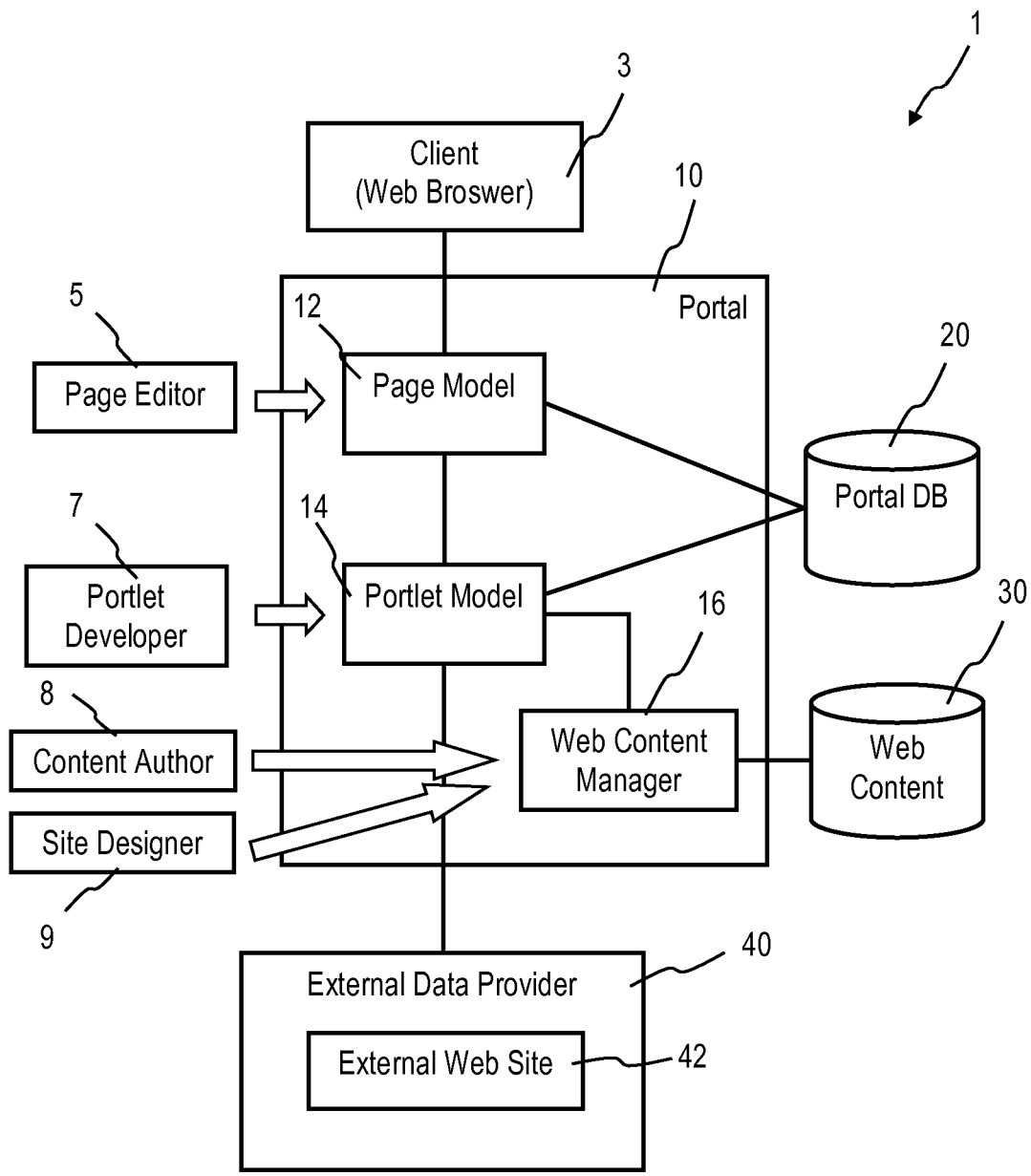
FIG. 1 is a schematic block diagram of a portal environment.
Figure 2:
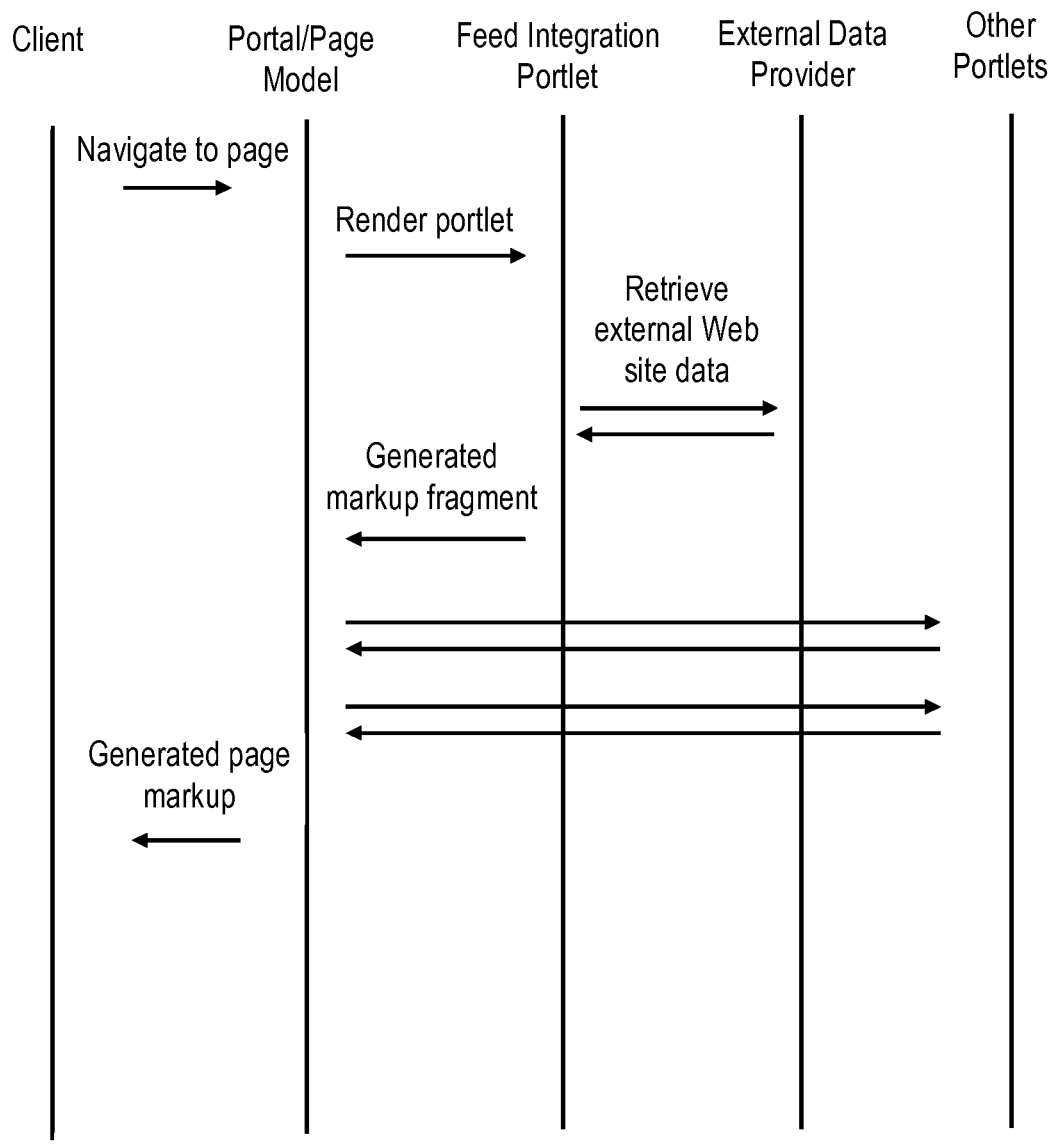
FIG. 2 is a conceptual representation of a component interaction flow.

Referring to FIGS. 1 and 2, a portal environment 1 comprises a portal 10 used by a client 3 and connected to at least one external data provider 40 that provides external feed data 42. To run at least one portal application the portal 10 comprises a page model component 12 comprising page models edited by an page editor 5, a portlet model component 14 comprising portlet models developed by a portlet developer 7, and a web content manager 16 used by content authors 8 and site designers 9 to create and update web content to be used. The page model component 12 and the portlet model component 14 are connected to a portal data base 20 that stores different page models and portlet models. The web content manager 16 is connected to a web content database 30 and comprises a web content rendering engine capable of transforming a given content item into markup that can be rendered by the client 3.

Referring to FIGS. 1 and 2, the integration of data from external web sites 42 of at least one external data provider 40 is done using dedicated integration portlets of the portlet model component 14 that retrieve feed-driven information, e.g. lists of social data like blog entries, list of shred bookmarks, etc., from a separate external web site 42, and generate corresponding markup to be added as markup fragment to the overall page.

In this approach, a page editor 5 can add external capabilities to a portal page by putting the right integration portlet onto the page, such that the appropriate feed-driven information gets added to the page. The conceptual component interaction flow between the web portal 10 and an external web site 42 is depicted in FIG. 2.

Referring to FIG. 2, in a first block the client 3 navigates to a page of the portal 10, and the page model component 12 and/or the portlet model component 14 render a corresponding portlet, where a feed integration portlet is used to retrieve external web site data from the external data provider. The feed integration portlet generates a markup fragment containing the retrieved external web site data. The page model component 12 and/or the portlet model component 14 retrieve further information and/or data from other portlets that are part of the corresponding page, and generate the overall page markup that can be rendered by a web browser of the client 3.

A problem with the above approach lies in the markup generation being controlled by portlet code. This implies that control of the visual appearance of external information infused in an overall portal page is not possible without changing portlet code and redeploying the portlets of the portlet model component 14. Such operation requires portlet programming skills and support from the portlet developer 7, to redeploy the portlets. Many customers are either not capable of doing this, since they are lack the corresponding development skills, or do not want to spend the money for this.

Furthermore, the field has proven that relying only on CSS (Cascading Style Sheets) styling capabilities for styling the markup generated by the portlets without having to adjust the code does not meet real life requirements for controlling the look and feel of external web site data on portal pages.

The general lack of control for the markup generation for external web site information is less of a problem in a stand-alone web site, since in the context of a dedicated web site the page only contains the user interfaces for modifying its own data and nothing else. Portal pages are made up of lots of other components, especially portlets and web content authored by content authors, and the customer expectation is that external web site information infused into such page should fit nicely into the overall look and feel of the portal page.

Various embodiments disclosed herein allow web content, instead of portlets, to control the retrieval of external web site information and leverage the web content management facilities available in modern web portals to transform retrieved feed-driven information into meaningful markup which nicely integrates with the overall look and feel of the portal site. With this approach, it is no longer necessary to involve software developers, i.e. portlet developer, to modify the visual appearance of external web site data on a portal site.

To this end, various embodiments disclosed herein introduce a new web content type called "feed-driven list definition" and new presentation type called "feed-driven list presentation." The feed-driven list definition content type is established as a new content or document type as it is supported by most model web content management systems. The new content type represents a query. It defines what kind of information to retrieve from the remote web site, how to filter it, how to sort it, and what feed-driven list presentation component to use for transforming the retrieved information into a markup fragment suitable for being rendered on a portal page.

As a starting point for web designers creating the visual appearance of lists of external data, the feed-driven list presentation component generates the list header and footer markup. The feed-driven list presentation component also provides access to a specific markup template that is dynamically applied to each external object (e.g. each blog post, wild page, file, etc.) contained in the list of external objects defined by the feed-driven list definition. Within this markup template, the site designer can make use of a corresponding web content management tag to extract individual pieces of metadata, e.g. title, author, summary, number of likes, number of comments, associated tags, etc., from the current external object in the list and merge this data into the static markup that shall be generated for each list item. The web content management tag just takes the documented name (e.g. "title", "author", "summary", "number of Likes", "number of Comments", "tags", etc.) of the metadata as input and writes the corresponding value of the current external object into the markup. System documentation will list all supported name values for this web content management tag. Embodiments disclosed herein can also provide wizard style user interfaces to let the site designer pick individual names from a drop down list, instead of having to explicitly type in those names.

As a result, content authors can define new lists of feed-driven objects by creating new content items or documents from the feed-driven list definition content type and apply the visual appearance by selecting the feed-driven list presentation component of choice. The latter are maintained by site designers to ensure an appealing and consistent look and feel across all components of the portal page. Thus, there is a clean separation of concerns between the content author, defining "what to select," and the site designer, defining how "lists of things" should look like on the page.

If the web content management system provides web content management user interfaces that work directly in the context of the given page, the task of creating new list definitions can be executed by the page editor already, by just using so-called "web content inline editing" capabilities in the context of the page, e.g. by dropping a new generic feed-driven list definition onto the page, entering the edit mode of the underlaying web content item, and adjusting the sources, filter, sort, and visual appearance preferences right in the context of the given page. So once the site designer has established the set of required feed-driven list presentations, the page editors can create all new lists without any further involvement from site designers. On the other hand, if the requirements for the visual representation of the list change, the site designer can adjust the corresponding feed-driven list presentation components once, and the changes are automatically applied immediately to all feed-driven lists on the page without having to involve someone with page editor skills.

A further benefit of the feed-driven list definitions and feed-driven list presentations being managed as web content is that the creation and update of those can, if desired, be managed in the same way other web content is managed in the system. That is, managing feed-driven list definitions and feed-driven list presentations can be done using workflow-based approval processes, previewing of new draft list definitions and presentations, versioning, leveraging reusable design components, like icons, styles, colors etc. managed by the web content management system, to support consistent look and feel, targeting of the right lists to the right user profiles, archiving and syndicating newly created or modified lists definitions and list presentations from an authoring system to individual delivery systems.

The above, as well as additional purposes, features, and advantages of embodiments disclosed herein will become apparent in the following detailed written description.

Figure 3:
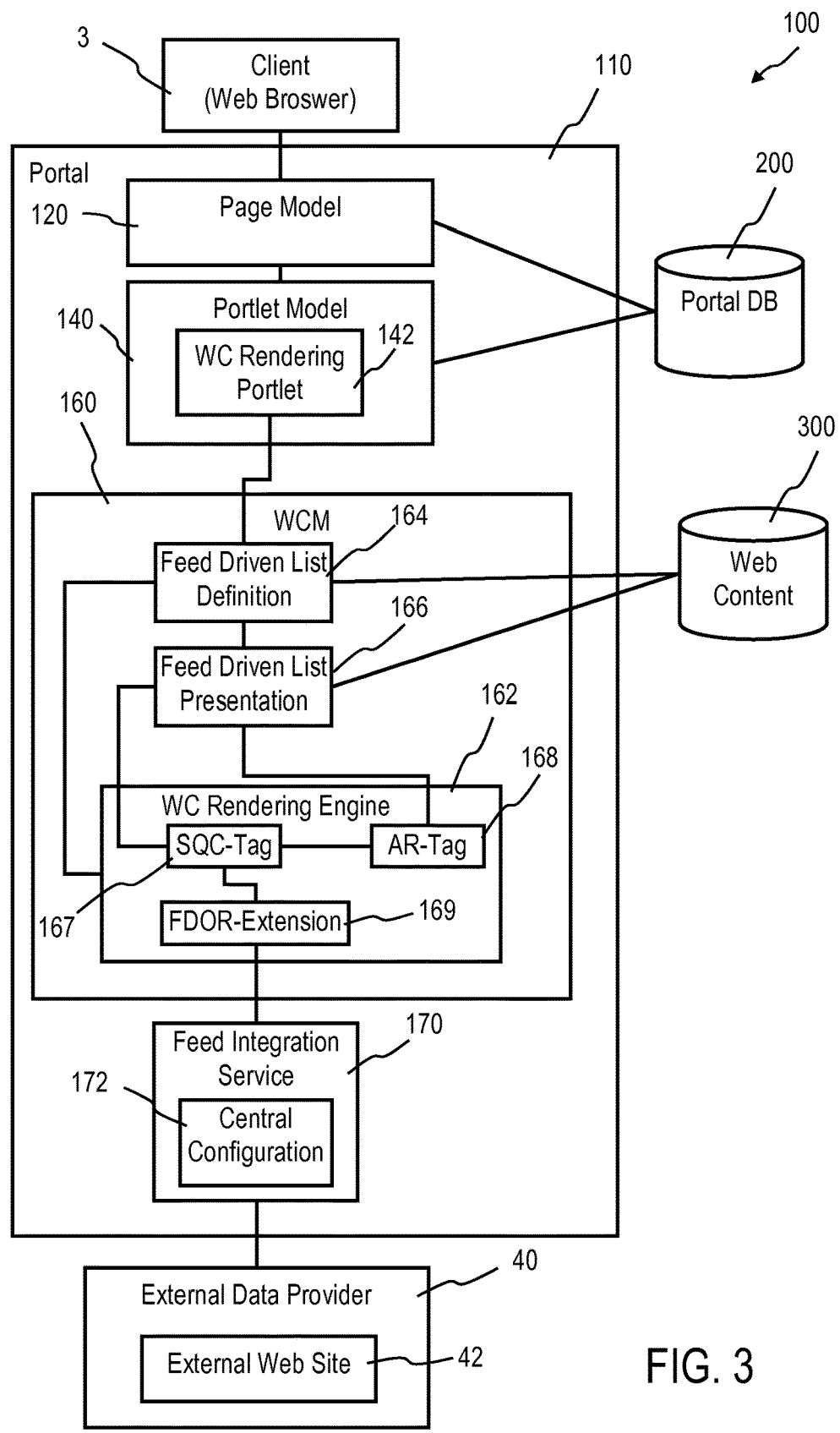
FIG. 3 is a schematic block diagram of a portal environment, in accordance with an embodiment of the present invention.
Figure 4:
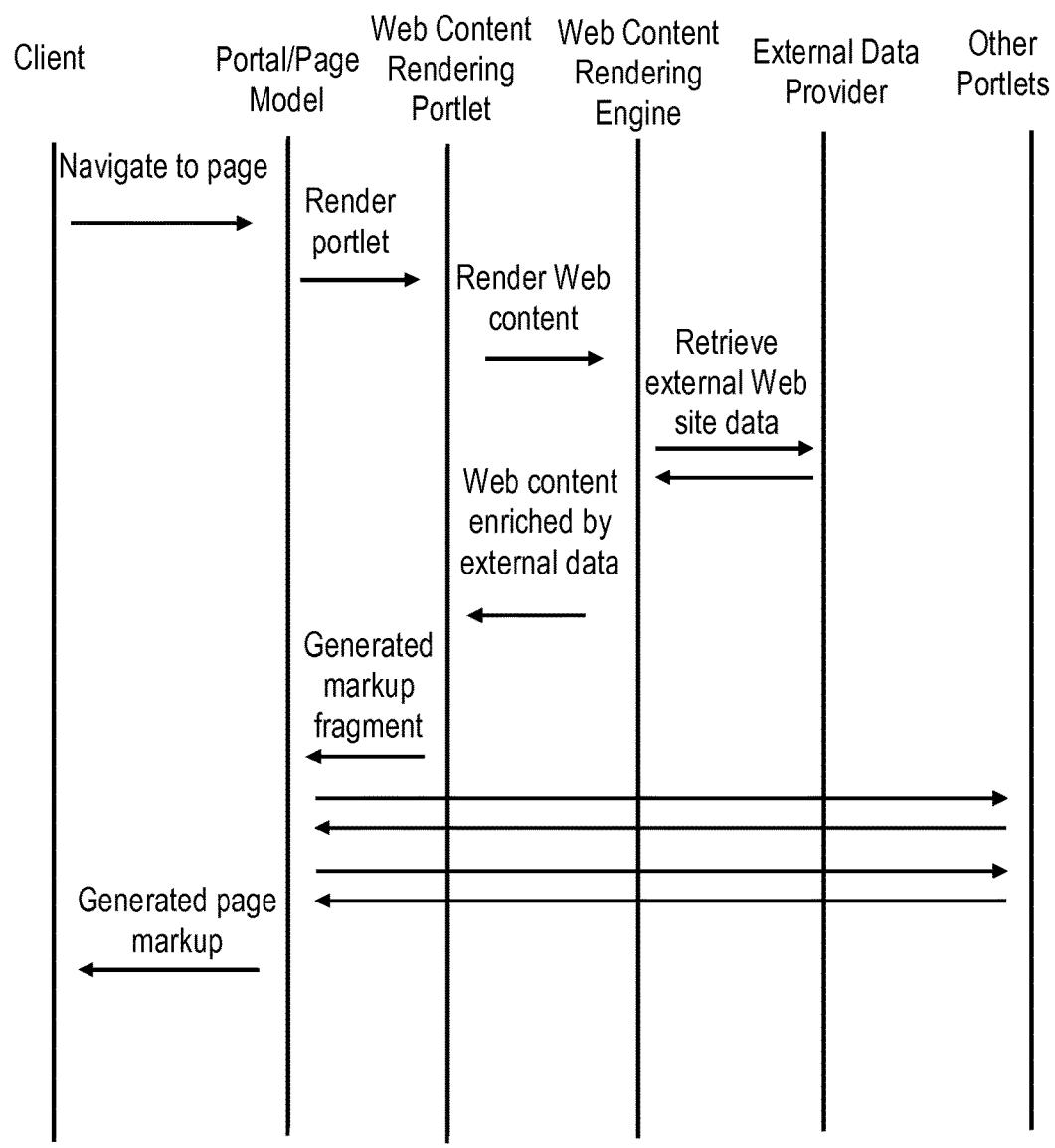
FIG. 4 is a conceptual representation of a component interaction flow, in accordance with an embodiment of the present invention.
Figure 5:
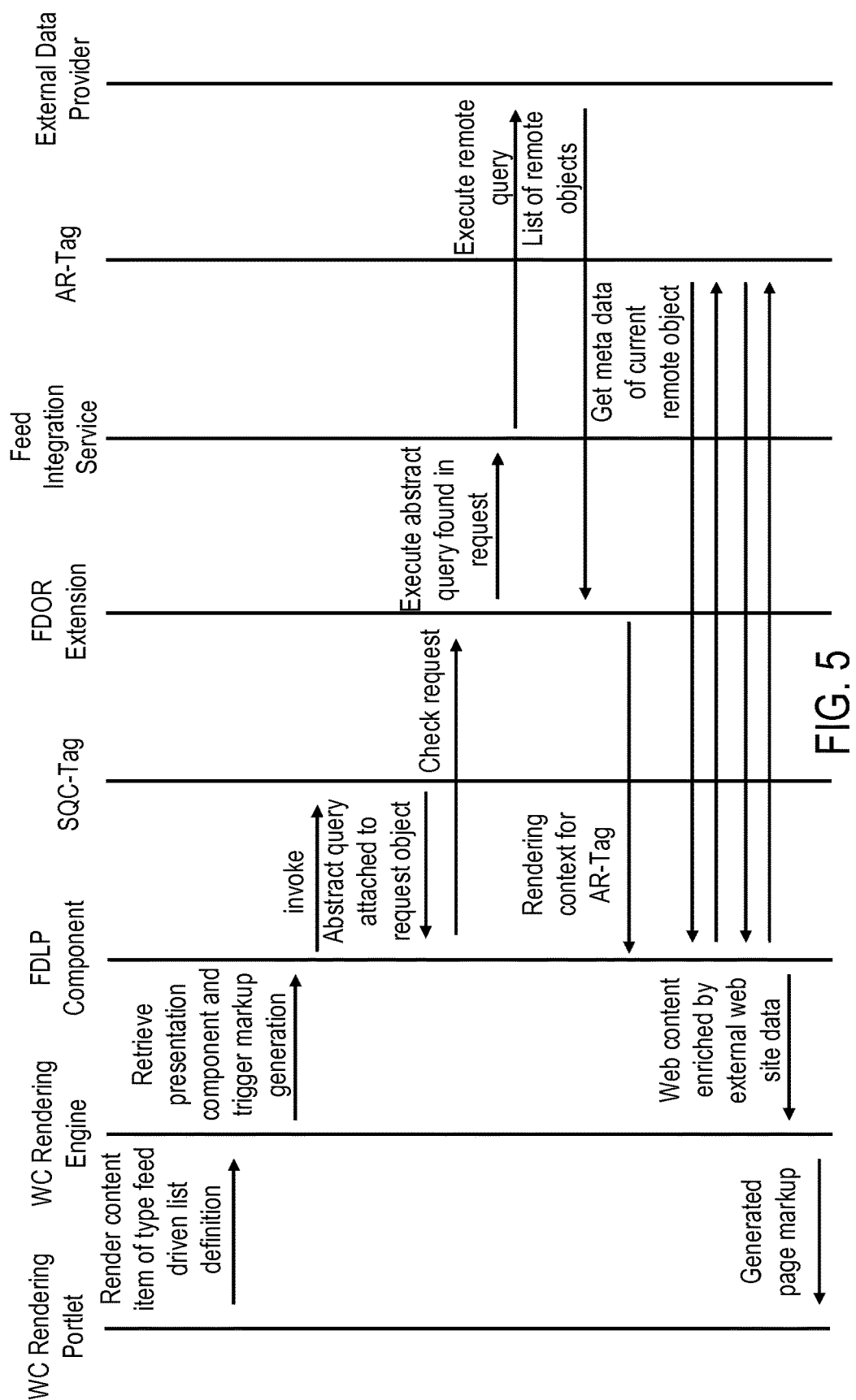
FIG. 5 is a more detailed representation of a component interaction flow, in accordance with an embodiment of the present invention.

FIG. 3 shows a portal environment 100, in accordance with an embodiment disclosed herein; FIG. 4 shows a component interaction flow, in accordance with an embodiment disclosed herein; and FIG. 5 shows a more detailed representation of a component interaction flow, in accordance with an embodiment disclosed herein.

Referring to FIG. 3, the illustrated embodiment employs portal environment 100 comprising a portal 110 used by a client 3 and connected to at least one external data provider 40 providing external feed data 42. To run at least one portal application, the portal 110 comprises a page model component 120, a portlet model component 140 comprising a web content rendering portlet 142, and a web content manager 160 that creates and updates web content to be used. The page model component 120 and the portlet model component 140 are connected to a portal data base 200 that stores different page models and portlet models. The web content manager 160 is connected to a web content database 300. The portal 110 further comprises a feed integration service 170 that facilitates data exchange between the at least one external data provider 40 and the portal 110. The web content manager 160 comprises: a web content rendering engine 162 capable of transforming a given content item into markup that can be rendered by the client 3; a feed-driven list definition 164 defining a new web content type representing a query to define what kind of information is to retrieve from the at least one external data provider 40 and how to handle the retrieved information to specify a corresponding content item; and a set of predefined feed-driven list presentation components 166 used to build a intended visual representation of the external data provider content item retrieved by the new web content type. The web content rendering engine 162 comprises a feed-driven objects rendering extension plug-in 169 that generates a query to the feed integration service 170 and that provides a corresponding response to the web content rendering engine 162 based on the new web content type.

In the illustrated embodiment the web content rendering engine 162 further comprises a first tag 167, also called Set-Query-Context-Tag, and a second tag 168, also called Attribute-Resource-Tag. The Set-Query-Context-Tag 167 provides information to the feed-driven objects rendering extension plug-in 169 about how to create the query to the feed integration service 170 based on the new web content type. The Attribute-Resource-Tag 168 provides access to individual metadata of remote data objects retrieved from the at least one external data provider 40.

The set of predefined feed-driven list presentation components 166 provides a simple starting point for web designers creating the visual appearance of lists of external data.

The web content rendering portlet 142 of the portlet model component 140 is capable of rendering a given content item by passing the reference to the content item to the web content management rendering engine 162 of the web content manager 160, and returning the received markup back to the portal page model 120 for page rendering.

The web content rendering engine 162 is like prior art web content rendering engines capable of transforming a given content item into markup that can be rendered by the client 3. Typically, the generated markup is HTML that gets rendered in the web content rendering portlet 142. The web content rendering engine 162 resolves web content manager tags that may be contained in the rendered web content. Those tags can be used to include other managed web components or to call custom code on the hosting server.

The new content types of feed-driven list definition component 164 defines the set of available feeds from external web sites 42, filter criteria, sorting criteria, the sort direction and the feed-driven list presentation to apply. The implementation of this content type typically consists of the definition of a corresponding authoring template that contains form fields for taking the values of choice for the listed parameter.

One example of a feed-driven list definition content type includes at least one of the following form fields: a form field "Title", representing a title of the given feed-driven list; a form field "Description", representing a description of the given feed-driven list; a form field "Source", representing a multi select option for selecting the object sources for the given feed-driven list, e.g. Blogs, Wilds, Files, Bookmarks, Events, Activities, Communities, User Profiles etc.; a form field "Filter by search term", representing a text field for specifying a search term that is used for filtering the returned list of objects; a form field "Filter by tags", representing a comma separated list of tag names that is used for filtering the returned list of objects; a form field "Filter by Access Control", representing a single select option for "public, shared, private" for filtering the returned list by the general accessibility constraint; a form field "Filter by Author", representing a text field for specifying an author name that is used for filtering the returned list of objects; a form field "Filter by community", representing a text field that can contain the identification (ID) of a specific community container, in that case the external web site 42 is a social site managing its data within communities, that shall be used for filtering the returned list of objects, in the sense that the feed-driven list shall be limited to objects contained in that specific community; a form field "Sort criteria", representing a single select option for "title, last updated, search rank" to choose the sorting criteria; and a form field "Sort direction", representing a single select option for "ascending, descending" for selecting the sort direction, and a form field "List presentation", representing component reference to the feed-driven list presentation component 166 producing the visual representation of the contents of this list.

An example list definition is: "Select all files uploaded to the "Social Site Development" community that are flagged with the tag "patent_disclosure" sorted by "last updated" in descending order.

Embodiments disclosed herein support graphical user interfaces for reading and writing to those form fields directly inside the web content rendering portlet 142, such that page editors can adjust the feed-driven list definition of the feed-driven list definition component 164 directly in the context of the portal page containing the list.

The Set-Query-Context-Tag 167 of the web content rendering engine 162 can be added to the presentation component rendering a feed-driven list definition of the feed-driven list definition component 164. The Set-Query-Context-Tag 167 extracts the values from the form fields of the given feed-driven list definition content item and builds an abstract object query from those values. This query is than attached as request parameter to the current portlet rendering request object. A simple syntax for the Set-Query-Context-Tag 167 reads: "[Plugin:SetQueryContext]."

The feed-driven objects rendering extension plug-in 169 gets triggered by the web content rendering engine 162 when rendering content items. The implementation of feed-driven objects rendering extension plug-in 169 looks for the request parameter attached by the Set-Query-Context-Tag 167. If no such parameter is set, the feed-driven objects rendering extension plug-in 169 performs no operation. If such parameter is associated to the current request object, the feed-driven objects rendering extension plug-in 169 takes the abstract query object built by the Set-Query-Context-Tag 167, and passes it on to the feed integration service 170 to get back a collection of software objects matching the given feed-driven list definition of the feed-driven list definition component 164.

The feed integration service 170 is a portal service that facilitates a central point of interaction with the external web site 42. The feed integration service 170 hosts a central configuration file 172 that contains all necessary information to communicate with a remote server of the external data provider 40, e.g. entry URLs for remote REST APIs of a Social Site. The feed integration service 170 provides a programming API that can be called from individual components running on the portal including the feed-driven objects rendering extension plug-in 169.

The Attribute-Resource-Tag 168 can be used to extract individual metadata from the individual objects returned by the feed integration service 170. A simple syntax for the Attribute-Resource-Tag 168 could reads: "[Plugin:AttributeResource attributeName="<name-of-meta-data-to-extract>"]." The system documentation describes all supported values for the name-of-meta-data-to-extract parameter. A proposed set of values for the name-of-meta-data-to-extract includes (but is not limited to):

"AccessControl"—this attribute indicates whether the remote object is public, private, or shared. "AuthorEmail"—this attribute references the email address of the author of the remote object. "AuthorID"—This attribute references the internal identification (ID) of the author of the remote object. "AuthorImageLink"—This attribute holds the link to the profile image of the author of the remote object. "AuthorName"—This attribute holds the name of the author of the remote object in the design of a feed-driven list. "NumberOfComments"—This attribute holds the number of comments associated with the remote object. "CommunityEntryLink"—This attribute represents the link to the API of the community containing the remote object. "CommunityLink"—This attribute represents the link to the community of the remote object. "DownloadLink"—This attribute is only served for remote objects of type file. It represents the URL pointing directly to the downloadable file. "EntryLink"—This attribute represents the link to the API of the remote object. "FileExtension"—This attribute is only served for remote objects of type file. It represents the file extension of the remote object. For example, the file extension can be .jpg, .mp3, or .pdf. "Id"—This attribute references the internal UUID (Universally Unique Identifier) of the remote object. "Link"—This attribute represents the link to the remote object. "NumberOfLikes"—This attribute holds the number of people who like the remote object. "RelevanceScore"—This attribute value expresses a relative assessment of the relevance of a remote object in the context of a search query. "Source"—This attribute holds the specific source, e.g. Wikis, Blogs, etc., that served the remote object. "Summary"—This attribute contains a summary of the remote object. "Tags"—The tags attribute holds the tags associated with the remote object. "Title"—The title attribute contains the title of the remote object. "Type"—This attribute carries the name of the content type of the remote object, e.g. Wiki Page, Wiki File Attachment, etc. . . . "Updated"—This attribute holds the time stamp of the last update operation performed to the remote object.

The set of predefined feed-driven list presentation components 166 provides a small set of predefined feed-driven list presentation components 166 that can be used as starting point for site designers to build their visual intended representation of feed-driven lists in the system. Site designers can also choose to create their feed-driven list presentation from scratch.

The feed-driven list presentation component 166 makes use of the Attribute-Resource-Tag 168 to merge the feed data retrieved from the external web site 42 into the static markup template applied to each entry in the result list. One example of a simple feed-driven list presentation looks like:

```
Header:
<table>
<tr>
<th>Title</th>
<th>Author</th>
<th>Number of likes</th>
<th>Number of comments</th>
</tr>
Footer:
</table>
```

-continued

```
List Item:
<tr>
<td>[AttributeResource attributeName="Title"]</td>
<td>[AttributeResource attributeName="AuthorName"]</td>
<td>[AttributeResource attributeName="NumberOfLikes"]</td>
<td>[AttributeResource attributeName=
"NumberOfComments"]</td>
</tr>
```

Referring to FIG. 4, in a first block the client 3 navigates to a page of the portal 100. The page model component 120 and/or the portlet model component 140 activates the web content rendering portlet 142 which in turn activates the web content rendering engine 162 to render a corresponding portlet comprising data content from the external web site 42. The web content rendering engine 162 retrieves the corresponding external web site data content from the external data provider 40. The web content rendering engine 162 enriches the web content to be rendered by the external web site data, and the web content rendering portlet 142 of the portlet model component 140 generates a markup fragment containing the retrieved external web site data. The page model component 120 and/or the portlet model component 140 retrieve further information and/or data from other portlets being part of the corresponding page and generate the overall page markup that can be rendered by a web browser of the client 3.

A more detailed component interaction flow for rendering a feed-driven list is depicted in FIG. 5.

The web content rendering portlet 142 triggers the rendering of a content item by passing the reference to the content item to the web content rendering engine 162, where the content item has the type of the feed-driven list definition component 164. The web content rendering engine 162 retrieves the associated presentation component and triggers the presentation component to generate markup based on the form field values available in the given content item defined in the feed-driven list definition. The feed-driven list presentation component 166 contains a reference to the Set-Query-Context-Tag 167 which builds an abstract query object from the form field values stored in the current feed-driven list definition and attaches this query object to the current portlet request object. The feed-driven objects rendering extension plug-in 169 detects this request parameter and triggers the query execution by passing the query object to the feed integration service 170. The feed integration service 170 performs the corresponding remote API calls, based on the central feed integration service configuration 172, and returns the API call result as a list of remote objects to the feed-driven objects rendering extension plug-in 169. The feed-driven objects rendering extension plug-in 169 establishes a corresponding rendering context that can be accessed by the Attribute-Resource-Tag 168 when generating the actual markup for the list. The markup generation is performed by first writing the markup stored in the header field to the markup stream. After that, the presentation component loops through all items in the list of remote objects contained in the current rendering context and applies the markup template stored in the presentation component to each object in the list. Applying the markup template in this context means that all Attribute-Resource-Tags 168 contained in the template are replaced by the corresponding values of the current remote object, with the result being written to the markup stream. Finally, the footer markup is written to the markup stream.

The overall resulting markup is than passed back to the web content rendering portlet 142 which in turn adds the markup fragment to the portal page.

Technical effects and benefits include providing a portal environment and a corresponding method for operating a portal environment, which are able to integrate external feed data, especially external website content into portal infrastructure, to improve the visual representation of website content on a portal page, and to solve the above mentioned shortcomings and pain points of prior art portal environments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A portal environment system, comprising:
   a portal, implemented by a computer, the portal used by a client and connected to at least one external data provider that provides external feed data;
   wherein the portal is operable to:
      transform a content item from the at least on external data provider into markup that can be rendered by the client;
      define a new web content type representing a first query that defines what kind of information to retrieve from the at least one external data provider and how to handle the retrieved information;
      read entries of the content item by a first tag, wherein the first tag provides information on how to create a second query based on the new web content type;
      generate the second query based on the new web content type, wherein the new web content type comprises a feed-driven list presentation component from a set of predefined feed-driven list presentation components to apply, wherein the set of predefined feed driven list presentation components comprises a plurality of feed-driven list presentation components used to build a visual intended representation of an external data provider content item retrieved by the new web content type, and wherein the new web content type comprises each of the following entries: a set of available feeds from the at least one external data provider, filter criteria, sorting criteria, and a sort direction, wherein the sorting criteria comprise each of the following options: title, last updated, and search rank, and wherein the filter criteria comprise each of the following options: specified search term, tag, access control, author, and community;

pass the second query to the at least one external data provider;

execute a remote application programming interface (API) call that corresponds to the second query;

receive a response, from the at least one external data provider, based on the second query, wherein one of the feed-driven list presentation components is selected for the external data provider content item based on contents of the portal;

create a rendering context which can be accessed by a second tag providing access to metadata for each of a set of remote objects that are retrieved from the at least one external data provider; and insert external data from the at least on external data provider into a markup by the second tag based on the set of predefined feed-driven list presentation component.

2. The portal environment system according to claim 1, wherein the portal is further operable to render a given content item of the new web content type.

3. The portal environment system according to claim 1, wherein the new web content type is implemented as a template containing form fields for each listed entry taking values of choice for a corresponding parameter.

* * * * *